(12) United States Patent
Luchangco et al.

(10) Patent No.: US 7,702,628 B1
(45) Date of Patent: Apr. 20, 2010

(54) IMPLEMENTING A FULLY DYNAMIC LOCK-FREE HASH TABLE WITHOUT DUMMY NODES

(75) Inventors: Victor Luchangco, Arlington, MA (US); Paul A. Martin, Arlington, MA (US); Jan-Willem Maessen, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 554 days.

(21) Appl. No.: 10/883,347

(22) Filed: Jun. 30, 2004

Related U.S. Application Data (63) Continuation-in-part of application No. 10/674,942, filed on Sep. 29, 2003.

(51) Int. Cl.
*G06F 7/00* (2006.01)
*G06F 17/30* (2006.01)

(52) U.S. Cl. .................. 707/6; 707/4; 707/5; 707/10; 707/101; 707/102; 707/104.1; 707/205

(58) Field of Classification Search .............. 707/3, 707/6, 8
See application file for complete search history.

(56) References Cited

U.S. PATENT DOCUMENTS

| | | | |
|---|---|---|---|
| 5,960,434 A * | 9/1999 | Schimmel | 707/100 |
| 6,026,093 A * | 2/2000 | Bellaton et al. | 370/412 |
| 6,067,547 A * | 5/2000 | Douceur | 707/100 |
| 6,625,592 B1 * | 9/2003 | Dyer et al. | 707/2 |
| 6,912,538 B2 * | 6/2005 | Stapel et al. | 707/101 |
| 6,976,021 B2 * | 12/2005 | Ramakrishnan | 707/7 |
| 6,988,180 B2 * | 1/2006 | Kadatch | 711/216 |
| 7,287,131 B1 * | 10/2007 | Martin et al. | 711/154 |
| 2003/0084057 A1 * | 5/2003 | Balogh | 707/100 |
| 2004/0064430 A1 * | 4/2004 | Klein et al. | 707/1 |
| 2004/0107227 A1 * | 6/2004 | Michael | 707/206 |

OTHER PUBLICATIONS

Talibard, Charles. "How to Implement Linked Lists in Wimpworks 2" Oct. 2002, Jaffa Software, pp. 1-16.*

* cited by examiner

*Primary Examiner*—Hosain T Alam
*Assistant Examiner*—Usmaan Saeed
(74) *Attorney, Agent, or Firm*—Park, Vaughan & Fleming LLP (57) ABSTRACT

One embodiment of the present invention provides a system that performs operations on a hash table that is fully dynamic and lock-free. This hash table is implemented with a linked list containing data nodes and a bucket array containing bucket pointers, wherein the bucket pointers point to portions of the linked list that function as hash buckets, and wherein the linked list contains only data nodes and no dummy nodes.

12 Claims, 11 Drawing Sheets

FIG. 1
(PRIOR ART)

FIG. 2A
Shalev-Shavit
(PRIOR ART)

FIG. 2B
(with proportional indexing)

IMPLEMENTING A FULLY DYNAMIC LOCK-FREE HASH TABLE WITHOUT DUMMY NODES

RELATED APPLICATION

This application is a continuation-in-part of, and hereby claims priority under 35 U.S.C. §120 to, a pending U.S. patent application entitled, "Method and Apparatus for Implementing a Fully Dynamic Lock-Free Hash Table," by inventors Paul A. Martin, Victor Luchangco and Jan-Willem Maessen, Ser. No. 10/674,942, filed 29 Sep. 2003.

BACKGROUND

1. Field of the Invention

The present invention relates to the design of lookup structures within computer systems. More specifically, the present invention relates to a method and apparatus for implementing a fully dynamic lock-free hash table without dummy nodes

2. Related Art

Figure 1:
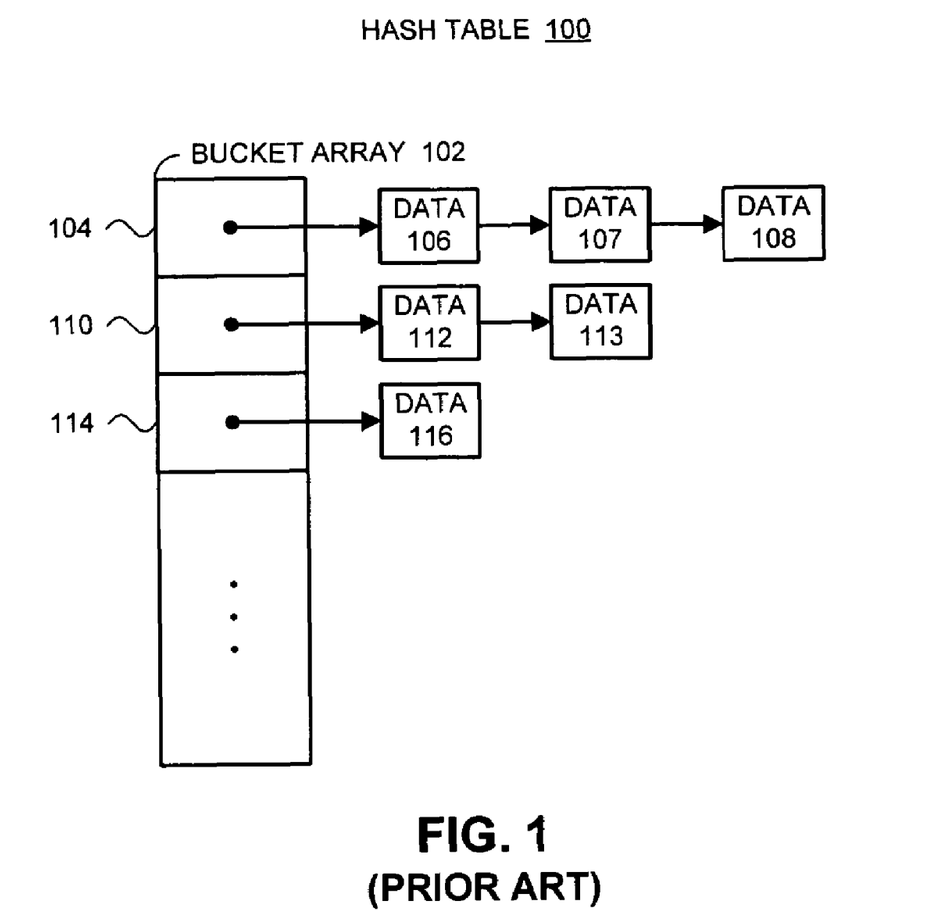
FIG. 1 illustrates a hash table.

Linear hash tables are commonly used to provide fast lookups for computer systems and computer applications. A linear hash table includes an array of buckets, which is occasionally resized so that on average each bucket holds an expected constant number of elements. This ensures that common hash table operations, such as insert, delete and search, require an expected constant time. For example, hash table 100 in FIG. 1 includes a bucket array 102, wherein each bucket 104, 110, and 114 includes a pointer to a linked list of data nodes 106-108, 112-113, and 116, respectively. In order to resize hash table 100 when the buckets become too full, each of the data nodes is typically "rehashed" into a larger bucket array.

The design of such hash tables becomes more complicated in a multi-threaded environment, because concurrently executing threads can potentially interfere with each other while performing operations on the same hash table. In order to prevent such interference, some hash table implementations use locks to prevent different threads from interfering with each other.

However, using locks can create performance problems. Locking an entire hash table can create a performance bottleneck because threads may have to wait for other threads to complete their hash table operations before obtaining access to the hash table. To mitigate this problem, some concurrent hash table implementations make use of multiple locks, which are associated with portions of the hash table. For example, if a hash table has N buckets, a different lock can be associated with each of the N buckets. This allows multiple threads to access different buckets in the hash table at the same time. However, in order to resize the hash table into a different number of buckets, the system has to first collect multiple locks, which can be an extremely time-consuming process. During the resizing process, all other operations dependent on these locks are prevented from making progress.

Because of the performance problems that arise from locks, a number of researchers have been developing lock-free data structures that operate efficiently in a multi-threaded environment.

Harris describes a way to build and modify a linked list that is lock-free and can be constructed using only load-linked (LL)/store-conditional (SC) or compare-and-swap (CAS) instructions (see Timothy L. Harris, "A Pragmatic Implementation of Non-Blocking Linked-Lists," *Proceedings of the 15th International Symposium on Distributed Computing*, October 2001, pp. 300-14).

Michael uses a slightly simpler variant of the Harris linked-list as the underlying structure to store the data nodes for each bucket. The Michael list forms the basis of the two state-of-the-art lock-free hash tables described below. The dynamic lock-free hash table by Michael is set up with a bucket array of a chosen size and an empty set of data nodes (see Maged M. Michael, "High Performance Dynamic Lock-Free Hash Tables and List-Based Sets," *The 14th Annual ACM Symposium on Parallel Algorithms and Architectures*, pages 73-82, August 2002). In the hash table of Michael, data nodes are added to the linked lists associated with each bucket, and can be deleted when they are no longer wanted in the hash table. Unfortunately, if the hash buckets get to be "too full," there is no way described to increase the number of buckets to reduce the average load.

Figure 2A:
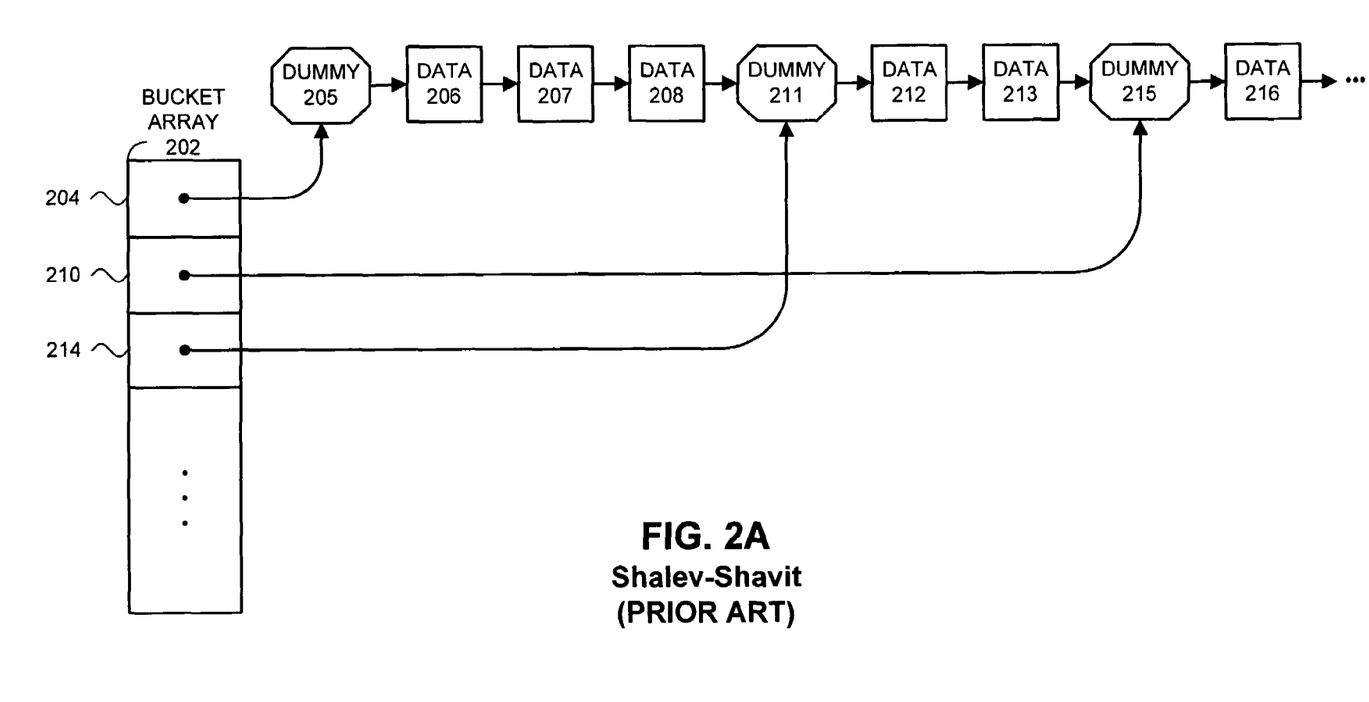
FIG. 2A illustrates a split-ordered list hash table with bit-reversed bucket pointers.

The split-list hash table by Shalev and Shavit is able to grow by doubling the size of the buckets table up to a pre-allocated limit (see Ori Shalev and Nir Shavit, "Split-Ordered Lists—Lock-free Extensible Hash Tables," Proceedings of the Twenty-Second ACM Symposium on Principles of Distributed Computing, pages 102-111, Jul. 13-16, 2003, Boston, Mass.). This doubling involves adding a new "usable" segment that is as big again as the part already in use, and filling it with "uninitialized" values so that references to these new buckets will set themselves up properly, as described below. Their key improvement is that the data nodes of the table are maintained in a single long linked-list (such as Harris') and do not need to be moved when the number of hash buckets changes (see FIG. 2A). FIG. 2A illustrates an exemplary bucket array 202, which includes buckets 204, 210, and 214. Buckets 204, 210, and 214 point to dummy nodes 205, 215, and 211, respectively. The linked list includes dummy nodes 205, 211, and 215, and data nodes 206-208, 212-213, and 216. This innovation requires using a special hash function similar to a design by Litwin et al. that orders the buckets to permit recursive splitting of the list (see Withold A. Litwin, "Linear Hashing: A New Tool for File and Table Addressing", Proceedings of the Sixth Conference on Very Large Data Bases, 1980, pages 212-223). The recursive splitting of the hash buckets means that every bucket (except the 0th one) has a "parent" bucket that is in some sense twice as coarse in dividing up the linked list.

The proper setup for Shalev-Shavit buckets is to have each bucket that has been referenced during a hash table operation point to a permanent dummy node in the otherwise-dynamic linked list that holds all the data nodes (see FIG. 2A). These dummies are assigned special hash keys, which are designed to fall in between the hash keys that are possible for data nodes.

The dummy nodes serve as place holders so that entering the linked list by way of the hash bucket will always provide a pointer to a dummy node that is at the head of the region associated with that portion of the hash mapping. Once a bucket pointer has been initialized with a pointer to the corresponding dummy node, it does not change.

These dummy nodes are essential to the correctness of the Shalev-Shavit hash table and can never be deleted. Their algorithm also offers no way to reduce the size of the bucket array. Consequently, as a hash table grows it may add many dummy nodes, but as its contents are deleted the dummy nodes must remain, leaving, in some cases, a large structure of buckets and dummies with very little actual data remaining.

Additionally, the sharing of bucket array elements as the bucket table grows dictates that the space for the growing segments of the bucket array must be pre-allocated sequentially with the initial portions, so that the space taken by the bucket array at all times is effectively the space it will take when it has reached the maximum size supported. This is an expensive overhead when the "live" portion of the array space is a small portion of the allocation, and, more seriously, it puts a limit that must be set initially on the ultimate size the bucket array may ever reach.

A later addendum to the Shalev-Shavit hash table uses additional indirection to ease this problem. It allocates a table of pointers to bucket table segments, and allocates the actual segments upon demand. This scheme reduces the bucket table overhead, but the pointer table is fixed size and must be pre-allocated, and any segment ever used must be retained.

Hence, what is needed is a method and apparatus for implementing a fully dynamic lock-free hash table without the overhead involved in having to maintain a large number of buckets and dummy nodes. By fully dynamic we mean a data structure wherein the space consumed is proportional to the number of items actually in the hash table at any time.

SUMMARY

One embodiment of the present invention provides a system that performs operations on a hash table that is fully dynamic and lock-free. This hash table is implemented with a linked list containing data nodes and a bucket array containing bucket pointers, wherein the bucket pointers point to portions of the linked list that function as hash buckets, and wherein the linked list contains only data nodes and no dummy nodes. During a lookup in the hash table, the system uses a hash key to lookup a bucket pointer in the bucket array, and follows the bucket pointer to a data node within the linked list that precedes nodes in an associated hash bucket. Next, the system searches through the linked list from the data node to locate a node that matches the hash key, if one exists.

In a variation on this embodiment, if the data node pointed to by the bucket pointer is a deleted node, the system performs a recovery operation. If the next pointer of the deleted node has been set to point backwards to a preceding data node, performing the recovery operation involves searching through the linked list from the preceding data node to locate a node that matches the hash key, if one exists.

Otherwise, if the next pointer of the deleted node points to a following node in the linked list, and therefore has not been set to point to a preceding node, performing the recovery operation involves obtaining a parent bucket pointer, and then searching through the linked list from a node pointed to by the parent bucket pointer to locate a starting node for the bucket pointer. The system then updates the bucket pointer to point to the starting node, and searches through the linked list from the starting node to locate a node that matches the hash key, if one exists. If the data node pointed to by the parent bucket pointer is a deleted node, the system recursively uses higher-level parent bucket pointers to locate a node that matches the hash key, if one exists.

In a variation on this embodiment, the system deletes a target node from the linked list by first using a key to determine a reference to the target node to be deleted from the linked list, and then atomically marking a next pointer in the target node to indicate that the target node is deleted. Next, the system attempts to atomically modify the next pointer of a node immediately preceding the target node in the linked list to point to a node immediately following the target node in the linked list, instead of pointing to the target node, thereby splicing the target node out of the linked list. This attempt will fail if the preceding node is marked deleted.

In a further variation, if a process that deleted the target node does not perform the splicing operation, another process, which subsequently detects that the target node has been deleted, can perform the splicing operation.

In a further variation, after the target node is spliced out of the linked list, the system modifies the next pointer of the target node so that the next pointer remains marked but points to the node that immediately preceded the target node when the target node was spliced out (instead of the node immediately following the target node in the linked list).

In a variation on this embodiment, atomically marking the next pointer in the target node to indicate that the target node is deleted involves atomically setting a "deleted bit" in the next pointer.

In a variation on this embodiment, atomically marking the next pointer in the target node to indicate that the target node is deleted involves creating a special node with a deleted type, which points to the immediately following node in the linked list. It also involves atomically replacing the next pointer of the target node with a pointer to the special node.

In a variation on this embodiment, when atomically marking the next pointer of the target node, if the next pointer indicates that the target node is already deleted, the atomic modification operation fails and the system takes a remedial action to deal with the fact that the target node is already deleted.

In a variation on this embodiment, the system inserts an additional node into the linked list by first identifying a node that should immediately precede the additional node in the linked list, and then identifying a node that should immediately follow the additional node in the linked list. Next, the system splices the additional node into the linked list by, setting the next pointer for the additional node to point to the immediately following node, and atomically updating the next pointer of the immediately preceding node to point to the additional node.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Split-List Hash Table with Deletable Dummy Nodes

One embodiment of the present invention provides a system that implements a hash table that is fully dynamic and lock-free. It shares the split-ordered list design of using a single linked list for all the data, with dummy nodes (that are deleted when no longer needed) to segment this list. But by substituting a new larger or smaller bucket array for the "old" one, the hash table can grow and shrink without limit as needed by the size requirements of the data. An included operation set covers incrementally moving the bucket pointers from the old array to the new one and deleting the unneeded dummies in the case where the new bucket array is smaller than the old one.

Figure 2B:
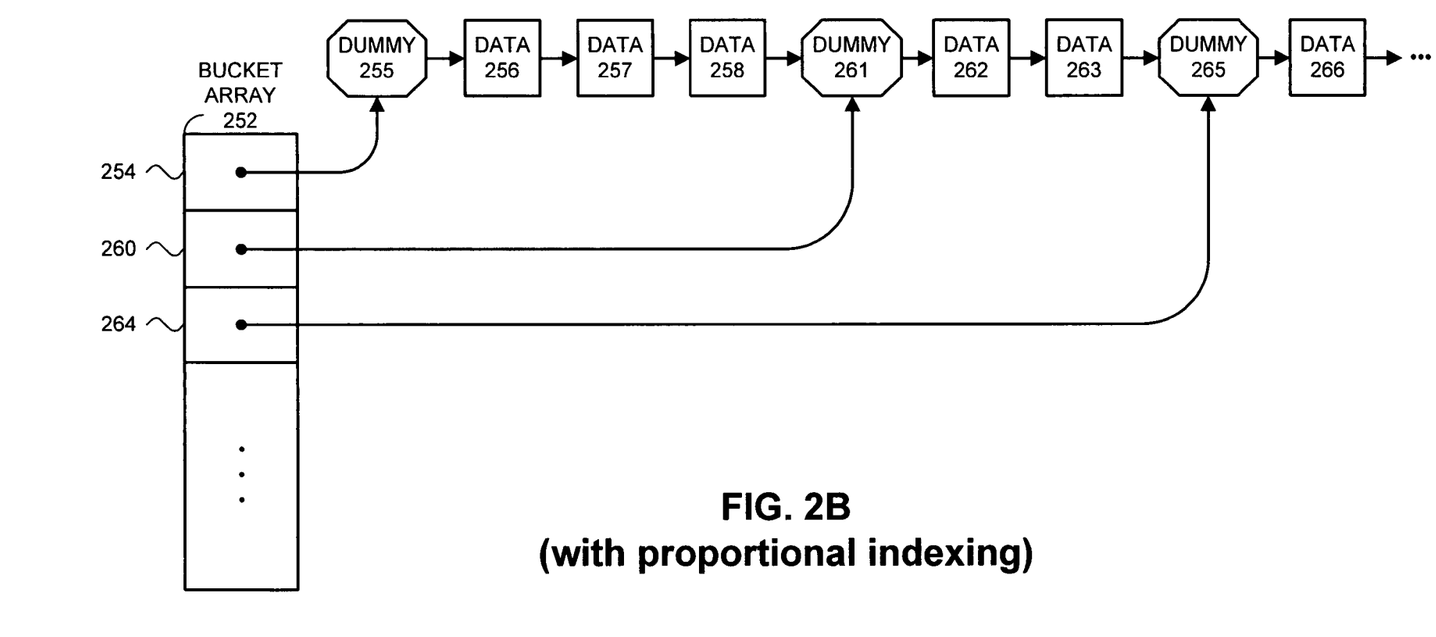
FIG. 2B illustrates a split-ordered list hash table with proportional bucket pointers.
Figure 2C:
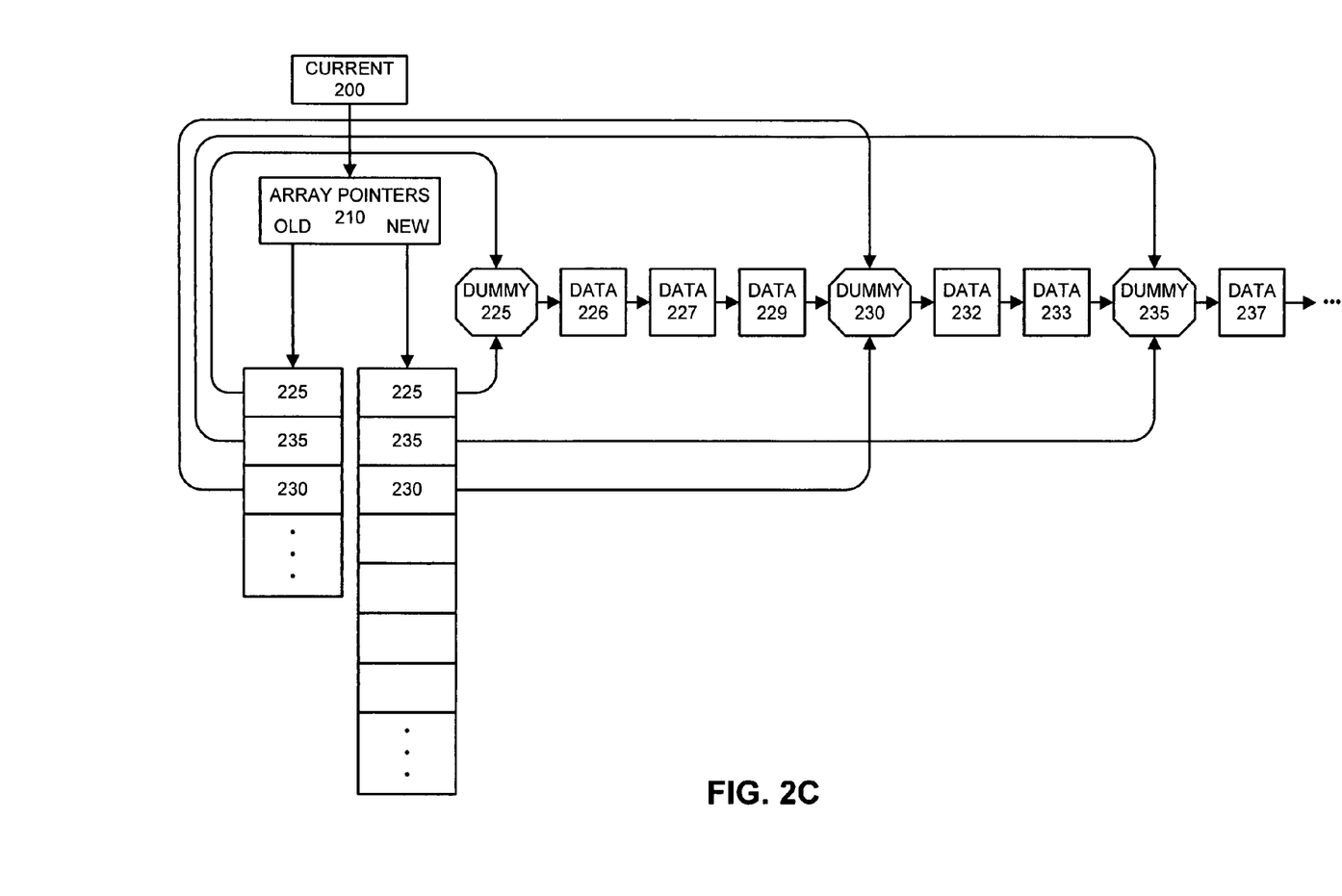
FIG. 2C illustrates a split-ordered list hash table with new/old bucket arrays and deletable dummy nodes in accordance with a bit-reversed indexed embodiment of the present invention.

FIG. 2C illustrates such an embodiment at a stage when the hash table bucket array had been determined to be too small and was replaced by a new one twice as large. FIG. 2C includes "current" pointer 200, array pointers 210, buckets which point to dummy nodes 225, 230, and 235, and data nodes 226-229, 232-233, and 237.

In the above-described embodiment of the present invention, the bucket array is allocated to the size needed initially, and filled with a special "uninitialized" value in all buckets except the first one, which is set to point to a dummy node that is the head anchor of the empty list of nodes.

As nodes are added to the hash table, the bucket array is filled in to point to dummy nodes added at locations statistically likely to evenly divide the linked list of the data. When the average number of nodes associated with a bucket becomes excessive, a process creates a new bucket array that is twice as large as the old one, initializes it as described in the previous paragraph, creates a "bucket tables" structure (210 in FIG. 2C) to hold the old array as "old" and the new one as "new", and then atomically switches the "current" pointer (200 in FIG. 2C) of the hash table to the new bucket tables structure.

Lookups are now done in the new bucket array, and when a bucket is found uninitialized the corresponding bucket of the old bucket array is copied if it has been initialized. If no corresponding bucket from the old array is available, the procedure uses the parent bucket in the new array.

Should the average number of nodes per bucket become too small, a similar action can establish a "bucket tables" structure with the new array half the size of the old one. The same sort of incremental copying moves the bucket pointers from the old bucket array buckets to the new one, but when the old array is larger than the new one there is an additional chore to complete; the dummies that are used by the old array but NOT by the new one are deleted in a manner that ensures that they are all gone before the old array is abandoned.

One way to achieve this dummy deletion is to include in the "bucket tables" structure a pointer to the lowest index in the "old" table of a dummy node that should be deleted but has not yet been deleted. Until this index reaches the end of the bucket table, each hash table operation is "taxed" with attempting to delete the next surplus dummy, and if successful, atomically moving the index to the next potential surplus dummy. It is convenient to set a special "all done" value (such as zero) in this index when no more deletions are needed. None are needed in the initial case where there is no old table, and also whenever the new table is larger then the old one.

This embodiment allows the bucket array to adjust to the optimum size for any given load of the hash table and removes any dummy nodes that are no longer needed to support the hash table structure.

Split-List Hash Table without Dummy Nodes

Figure 2D:
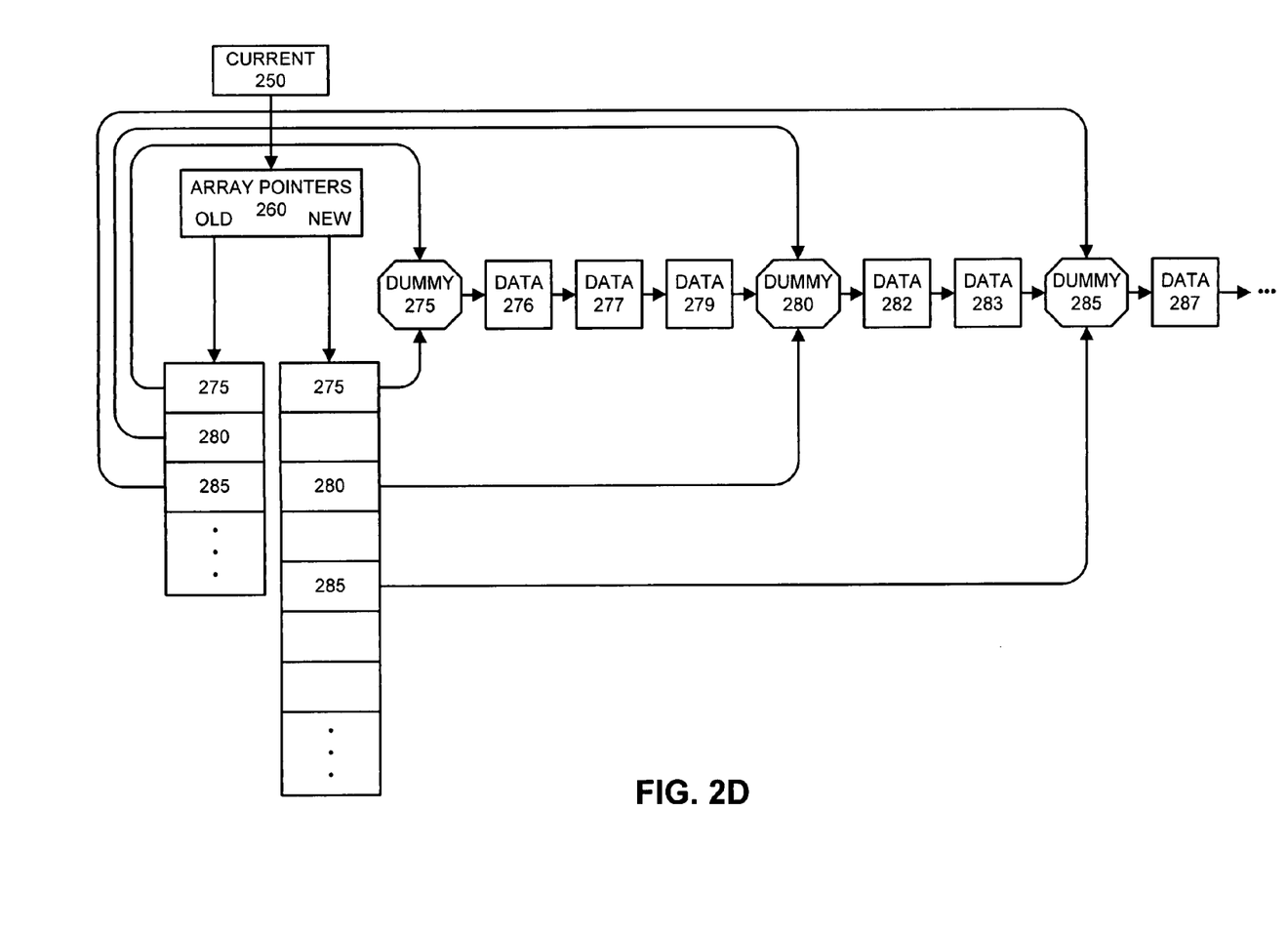
FIG. 2D illustrates a split-ordered list hash table with new/old bucket arrays and deletable dummy nodes in accordance with a proportional indexed.
Figure 3A:
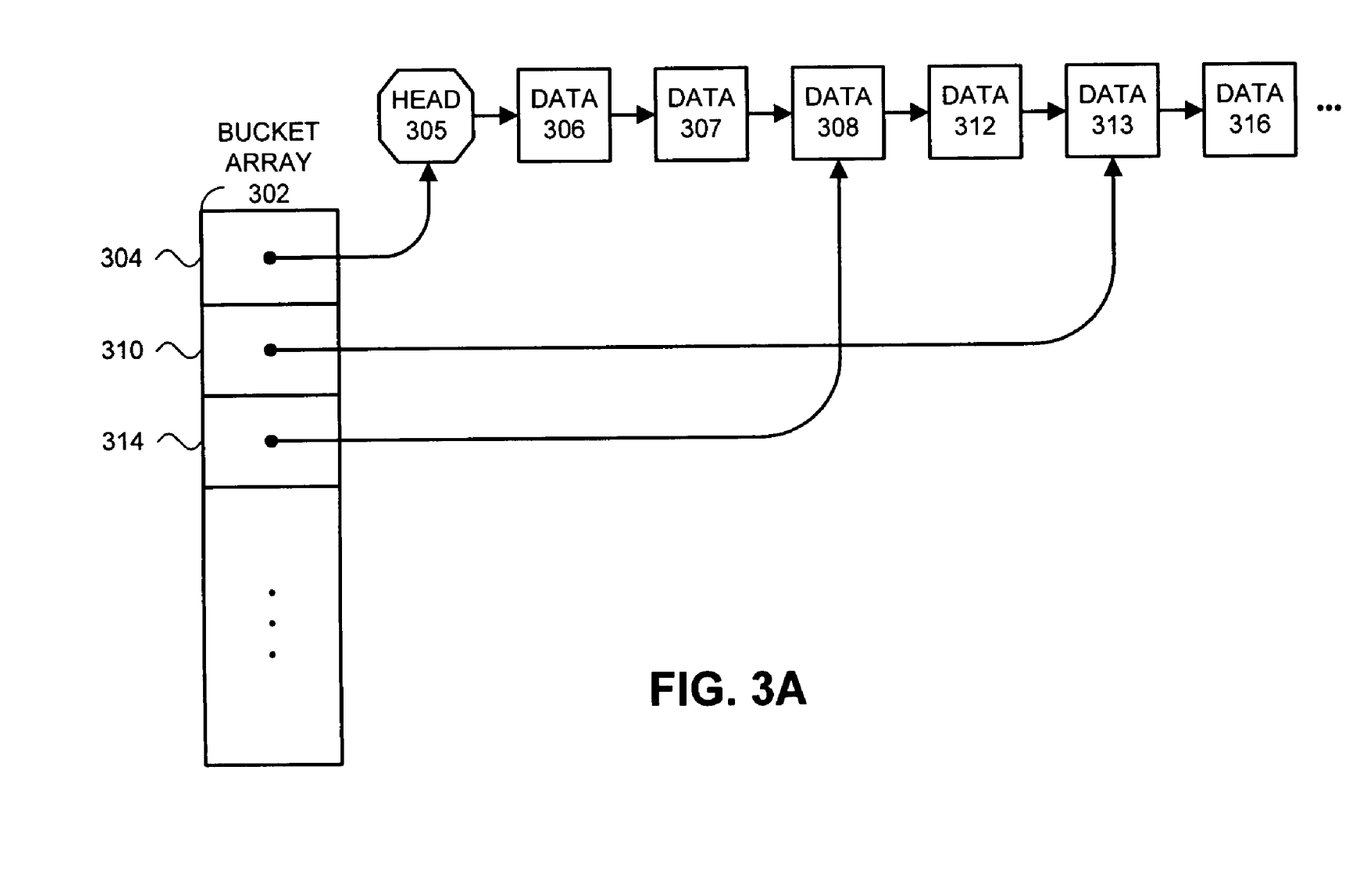
FIG. 3A illustrates a split-ordered list hash table without dummy nodes in accordance with a bit-reversed indexing embodiment of the present invention.
Figures 3B, 4:
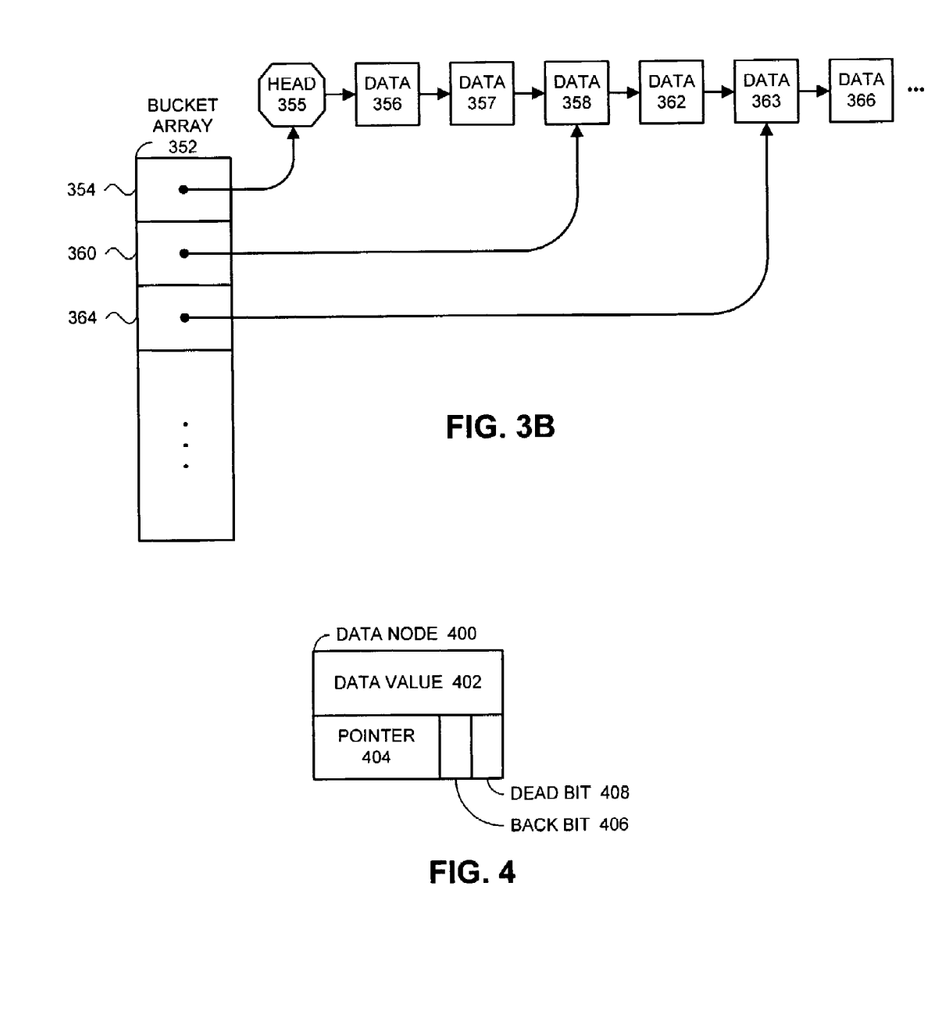
FIG. 3B illustrates a split-ordered list hash table without dummy nodes in accordance with a proportional indexing embodiment of the present invention.
FIG. 4 illustrates a data node in accordance with an embodiment of the present invention.

FIG. 2D illustrates a split-ordered list hash table with new/old bucket arrays and deletable dummy nodes in accordance with a proportional indexed. FIG. 2D includes "current pointer" 250, array pointers 260, buckets which point to dummy nodes 275, 280, and 285, and data nodes 276-279, 282-283, and 287. Another embodiment of the present invention improves on Shalev-Shavit by removing the need for dummy nodes as illustrated in FIGS. 3A and 3B. FIG. 3A illustrates an exemplary bucket array 302, which includes buckets 304, 310, and 314. Buckets 304, 310, and 314 point to head node 305, data node 313, and data node 308, respectively. The linked list includes dummy head node 305, and data nodes 306-308, 312-313, and 316. FIG. 3B illustrates an exemplary bucket array 352, which includes buckets 354, 360, and 364. Buckets 354, 360, and 364 point to head node 355, data node 358, and data node 363, respectively. The linked list includes dummy head node 355, and data nodes 356-358, 362-363, and 366. Removing the dummy nodes saves space proportional to the largest number of buckets ever used with the hash table. It also allows arbitrarily small (the restriction is two or more buckets) bucket arrays, thereby freeing the storage used by the hash table in a previous period when it was larger. (Note that the linked lists in FIGS. 3A and 3B include head nodes, 305 and 355, at the start of the linked lists, which do not contain data, and which point to first nodes, 306 and 356, in the linked lists that do contain data.)

Furthermore, note that the dummy-nodes embodiments use an extra bit in the hash key to ensure that dummy nodes fall before real ones. By dispensing with dummy nodes, we can use the full width of the hash key (including the extra bit); this halves the likelihood of a collision during a hash table lookup.

In the above-described embodiment of the present invention, the hash search operation is similar to the hash table search operation described in Shalev/Shavit. Referring to the flow chart in FIG. 5, the system first performs a pre-hashing operation to generate a hash key that achieves a substantially uniform distribution of hash keys over possible hash key values (step 502). Next, the system uses the hash key and the size of the bucket array to lookup a bucket pointer in a bucket array (step 504). The system then determines if the bucket pointer is initialized (step 505). If not, the system (step 507) uses the method portrayed in FIG. 8 to initialize the bucket. Initializing a bucket is a possibly recursive operation; it may require initializing the parent bucket before the bucket can be initialized. Once the bucket is initialized, the system then returns (507) and proceeds to step 506.

Figure 5:
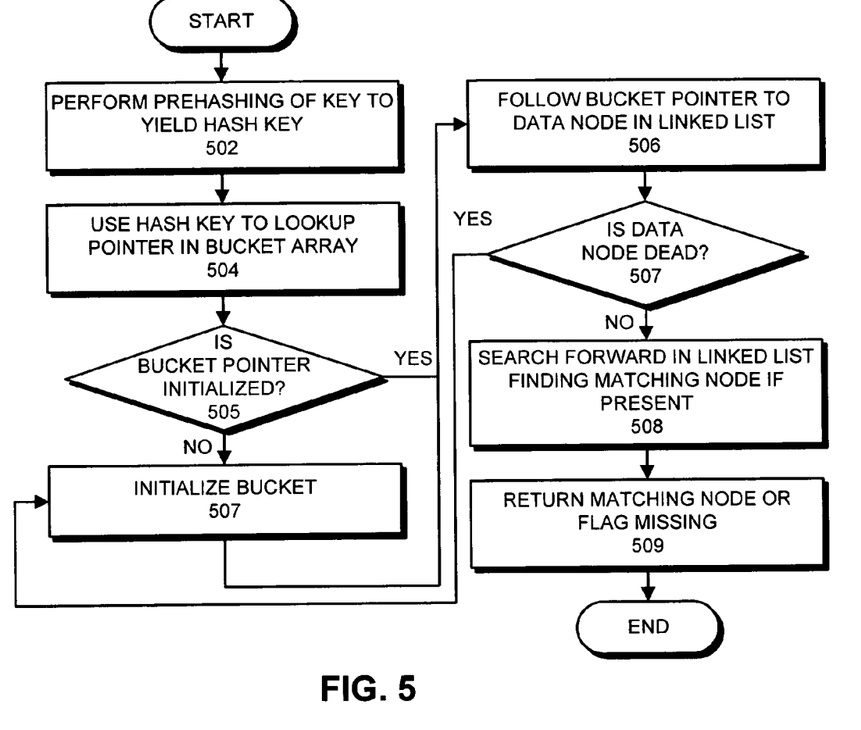
FIG. 5 presents a flow chart illustrating a hash table search operation in accordance with an embodiment of the present invention.

Once the bucket pointer is initialized, the system follows the bucket pointer to a data node in the linked list (step 506). Next, the system determines if the data node is dead (step 507). If so, the system returns to step 507 to perform a recovery (initialization) operation using the parent bucket.

If the data is not dead at step 507, the system performs a search starting from the data node to locate a node that matches the hash key, if one exists (step 508). The system then either returns the matching node or reports that the requested node is missing (step 509).

While a system using dummy nodes can arrange to have the dummies fall "between" the data nodes, a linked list without dummies must always point the bucket array buckets at a data node that falls before the first data node that would follow the dummy, had there been one. By treating the bucket pointers as hints that always point before the first data node in the bucket, we can guarantee that a search starting from one will not miss a more recently inserted node.

After any access to the hash table, the bucket pointer used is changed to point to the data node that has the highest hash key that is LESS than the keys that should be "in" this bucket (if it does not already do so) according to the ordering imposed on the linked list. This is the node that would fall just before the dummy in the Shalev/Shavit algorithm. Subsequent additions to the "previous" bucket may add nodes after this one which also belong in the "previous" bucket, so adjusting the bucket pointer may be done whenever it no longer points to the node immediately before the first data node of the corresponding bucket.

One embodiment of the present invention modifies the underlying Michael linked list to include backward pointing recovery hints in the nodes that have been deleted. These nodes serve the "permanence" role of the dummy nodes in the Shalev/Shavit hash table, but can be recovered (e.g., using garbage collection) instead of remaining forever a part of the hash table.

Node Deletion

The Michael linked list deletes a node by first marking a special DEAD bit that is part of the pointer bucket where the NEXT pointer is stored. Once the DEAD bit is set, the node is logically deleted. Keeping this dead bit in the pointer word provides the atomicity needed to allow exactly one process, in one atomic instruction, to claim the node in a way that is public to all other threads, concurrent or subsequent. Once the DEAD bit is set, the process deleting the node can atomically alter the NEXT pointer of the predecessor of the dead node to point around it to the next node. Once the splicing-around step is completed, no live node in the linked list points to the deleted node.

Bucket pointers that point to dead nodes are no longer useful, but a recovery through the "parent" node as in initialization will allow the search to succeed and eventually remove the references to the dead node, allowing the garbage collector or another process to collect the storage it consumes. This approach is simple and effective, but requires a recovery-from-parent step whenever the node that is pointed to by a bucket is deleted.

Back-Linked Lists

One embodiment of the present invention uses these dead nodes in one further way; until some thread has spliced the list to point around a dead node, the NEXT pointer of that node is the only source of information to allow other threads to follow the linked list. It is literally holding the list together (in the case where the thread doing the deletion stalls) and so it cannot be altered or removed until the list is spliced around it. But once a node is spliced around, we can use its NEXT pointer for a different purpose—we redirect it back to the previous predecessor node. Thus, a thread that follows this back pointer may quickly find a live node that precedes this node in the list.

Subsequent operations following the next pointer of live nodes will not see this node (it has been spliced around). However, threads that were stalled while it was being deleted may remember it as the NEXT of its (possibly former) predecessor node, and it may be pointed to by one or more bucket pointers.

The thread that finds the node with a back pointer can tell that the pointer is not a normal forward one—either because an additional BACK bit is set in the pointer word or by comparing the hash key of the node pointed to by the bucket pointer (either stored in the buckets or computed on the fly from the real stored value) to the previous one and noting that they are out of order.

Referring to FIG. 4, in one embodiment of the present invention, each data node 400 includes a data value 402, as well as a next pointer 404. The two lower order bits of the next pointer can be used as BACK bit 406 to indicate that pointer 404 is a back pointer, and a DEAD bit 408, to indicate that the data node is dead. (The standard addressing modes of modern computers allocate sufficient bits in the address to specify single bytes, and the nodes used in a linked list are always multiples of four bytes in length, so there are logically at least two bits available, and the DEAD bit uses just one.)

Figure 6:
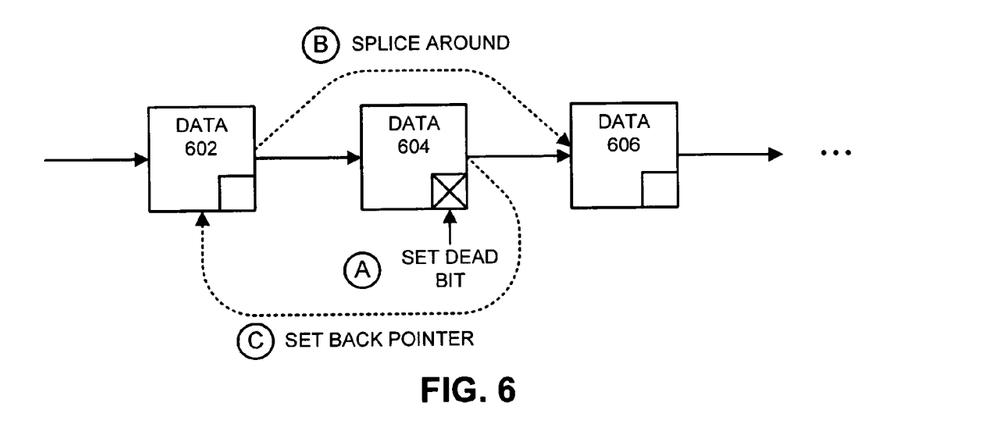
FIG. 6 illustrates a node deletion operation in accordance with an embodiment of the present invention.
Figure 7A:
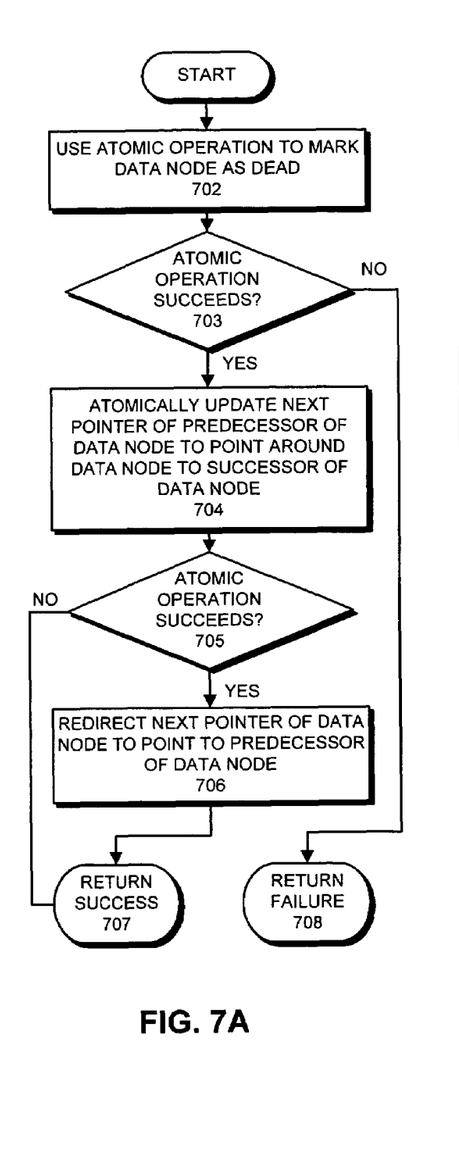
FIG. 7A presents a flow chart of a node deletion operation in accordance with an embodiment of the present invention.
Figure 7B:
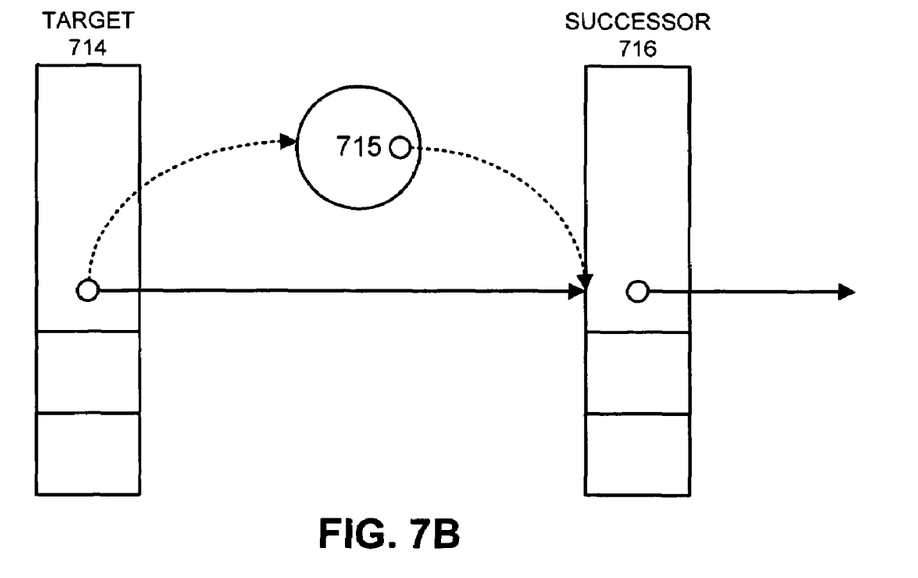
FIG. 7B illustrates an alternative marking process that replaces the next pointer with a pointer to a special delete type node in accordance with an embodiment of the present invention.

Referring to FIGS. 6, 7A and 7B, in one embodiment of the present invention, the system deletes a data node by first using an atomic operation to mark that data node 604 as dead (step A and step 702). If this atomic operation fails, the system returns a failure (step 708).

Otherwise, if this atomic operation succeeds, the system atomically updates the next pointer of the predecessor 602 of data node 604 to point around data node 604 to the successor 606 of data node 604 (step B and step 704). If this atomic operation fails, the system returns a success (step 707).

Otherwise, if this atomic operation succeeds, the system redirects the next pointer of data node 604 to point to the predecessor 602 of data node 604 (step C and step 706), and the system returns success (step 707).

A thread following back pointers may eventually encounter a deleted node that is still pointing forward; the deletion process for this node was not "finished." However, the thread following the back pointer does not have sufficient information to finish the deletion.

In one embodiment of the present invention, instead of setting the delete bit to mark the next pointer, the system creates a special "delete type" node 715, which points to the immediately following node in the skip list, and replaces the next pointer in target node 714 with a pointer to special node 715 as is illustrated in FIG. 7B. It is then possible to determine if a node is deleted by looking to see if its next pointer points to a "deleted type" node. Note that successor node 716 is the next node. In this embodiment, swinging the next pointer of target node 714 back to point to predecessor node 712 involves setting the pointer within special node 715 to point back to predecessor node 712. Note that this technique does not require the garbage collection process to be modified to ignore deleted bits.

Recovering from a Bad Pointer Chain

Figure 8:
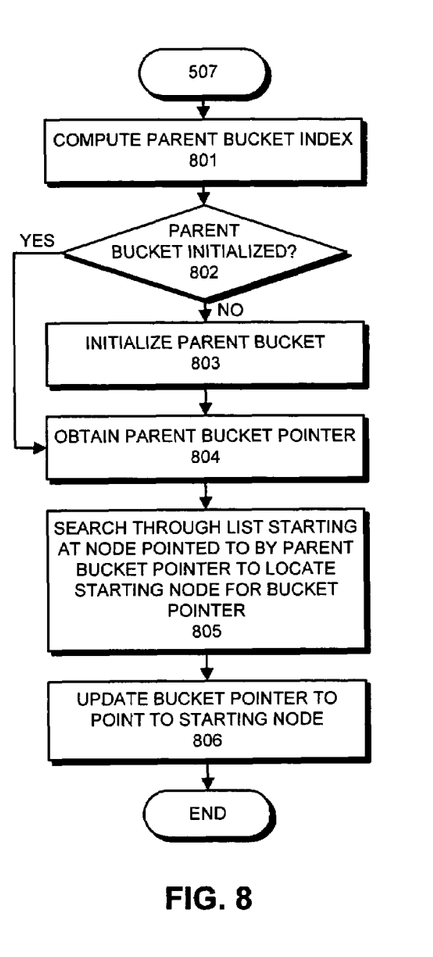
FIG. 8 presents a flow chart illustrating how a bucket pointer is updated or initialized in accordance with an embodiment of the present invention.

A thread can recover from finding that a backward chain fails to lead to a live node in the same way as when discovering a bucket pointer is not yet initialized. The process uses the "parent" bucket pointer to find the correct starting point in the split-list, and then updates the "bad" bucket pointer for subsequent use. Referring to FIG. 8, the system first computes the parent bucket index. (step 801). The system then determines if the parent bucket is initialized (step 802). If not, the system initializes the parent bucket (step 803). Next, the system obtains the parent bucket pointer from the parent bucket (step 804). The system then searches through the list starting at the node pointed to by the parent bucket pointer to locate a starting node for the bucket pointer (step 805). (This starting node is the predecessor node of the first node encountered that should fall within the bucket.) The system then updates the bucket pointer to point to the starting node (step 806). Using an atomic update such as CAS prevents stalled threads from writing old values here.

The above-described technique works recursively if the parent bucket is also un-initialized or pointing to a forward-pointing deleted node. (Note that if the linked list is empty, the top-level parent node points to a head node, which is never deleted, which does not contain any data, and which in the empty case does not point to any data nodes.)

An effective way to use the back pointers while avoiding possibly wasting a large amount of effort is to pursue back pointers and the recursive parent-based recovery in parallel—take a single step along both recovery paths and stop recovering when either succeeds. Notice that this strategy may lead us to also pursue a chain of back pointers from a deleted node found while following the parent bucket pointer, or its parent bucket pointer, etc. This parallel recovery scheme limits the depth of descent to the minimum caused by either method at the price of multiplying the effort (though still just a constant factor) at each stage.

Shrinking/Growing the No-Dummy-Nodes Hash Table

The overall design of the no dummy nodes hash table makes reducing the number of buckets very easy—just reset (using a CAS) a CurrentSize limit to half the previous size (subject to a minimum size) and set (using a CAS) a pointer to the high bucket index that needs to be cleaned to "uninitialized" to allow garbage collection to claim the dead nodes that may be pointed to by the now-unused buckets. This cleaning work can be farmed out to be done as a side chore by each access to the hash table until all the cleanup is done (producing low delays for all calls) or can be done entirely by the thread that decided to shrink the table.

With dummy nodes eliminated, this no-dummy-nodes version does not have to wait for completion of the cleanup—the danger of deleting a dummy node that is once more in use is fundamentally removed.

Both growing (as described by Shalev/Shavit) and shrinking (as described above) assume that the array size allocated for the bucket array is not changed, but this is an unnecessary restriction. By creating a new bucket pointer array that is the new size (say either twice or half the size of the now-christened "old" one), we can remove the limitation to the initially allocated array size. The process is altered to look in the new bucket first, and if the bucket is not initialized, look in the corresponding bucket (if any) of the "old" table, copying its contents if it has been initialized. Switching to a new table is done atomically in a manner similar to the one described for the hash table wherein dummy nodes were deleted upon shrinking the table.

The task of copying the contents of the part of the old table that corresponds to the new one can be handled by a number of methods, since only efficiency, the amount of work that is "taxed" to a given hash table operation, and the overall period of use of the storage are affected—these choices do not impact the correctness of the algorithm. (Unlike the case of deletable dummy nodes, this is true even when shrinking.)

Figure 9:
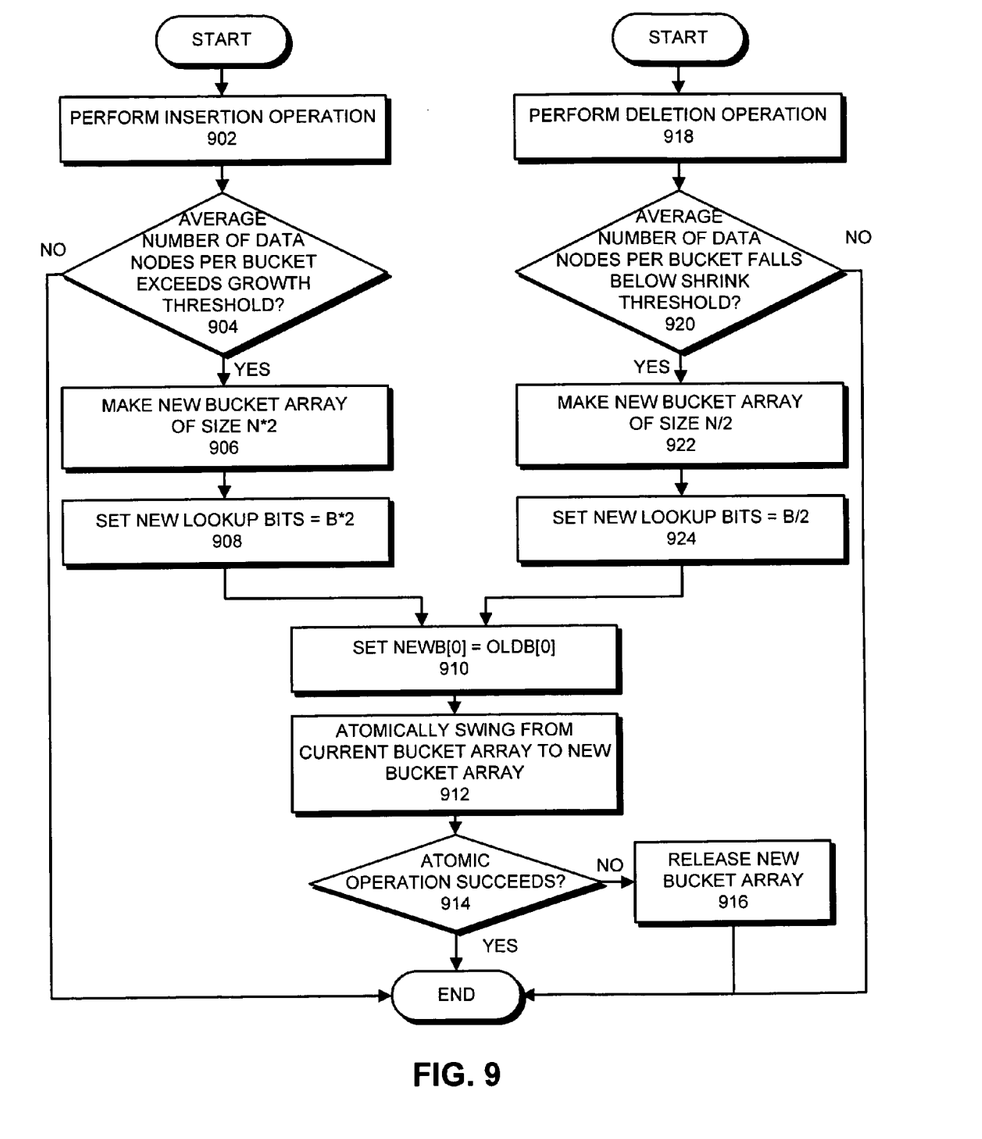
FIG. 9 presents a flow chart illustrating how the number of buckets in a hash table is increased and/or decreased in accordance with an embodiment of the present invention.

Referring to FIG. 9, the task of growing the number of buckets in the bucket array is typically triggered by a node insertion operation that adds a data node to the hash table (step 902). After a node is inserted, the system determines if adding this data node causes the average number of data nodes per bucket to exceed a growth threshold (step 904). If so, the system doubles the number of buckets in the bucket array (step 906). The system also sets the new lookup bits to be double the value of the old lookup bits (step 908), and swaps the new lookup bits with the old lookup bits (step 910). Next, the system uses an atomic operation to swing a reference from the new bucket set current bucket array to the new bucket array (step 912). If this atomic operation succeeds, the process terminates. Otherwise, if the atomic operation fails, the system releases the new bucket array (step 916), and the process terminates. (Note that empty buckets in the bucket array are subsequently initialized as they are referenced during subsequent hash table operations.)

The task of shrinking the number of buckets in the bucket array is typically triggered by a node deletion operation that deletes a data node from the hash table (step 918). After a node is deleted, the system determines if deleting the node causes the average number of data nodes per bucket to fall below a shrink threshold (step 920). If so, the system halves the number of buckets in the bucket array (step 922). The system also sets the new lookup bits to be half the value of the old lookup bits (step 924). Next, the system performs steps 910, 912, 914 and 916 in the same manner as described above for the process of growing the number of buckets.

Variation on Recursive Split-Ordering

One potential problem with the Shalev/Shavit hash table concerns the use of "recursive split-ordering" to sort the elements in the linked list. The recursive split-ordering is achieved by simple binary bit reversal: reversing the order of the bits of the hash key so that the new keys' most significant bits are those that were originally its least significant. Because every operation of the Shalev/Shavit hash table implementation must search in the linked list of elements, every operation must perform this binary reversal. In addition, every node must store the bit-reversed key, or a bit-reversal must be performed for each node accessed. Reversing bits, while conceptually simple, is not directly supported in most computer hardware, and consequently may be relatively expensive. The best-case cost for performing a bit reversal on commonly available hardware is bounded by log N for N bits of data.

Shalev and Shavit have described the use of the recursive split-ordering as "the key algorithmic breakthrough" of their hash table algorithm. Because their linked list is kept in recursive split order, using the low-order bits of the original hash key as the index into the bucket array—that is, the function to hash keys into $2^N$ buckets simply takes the remainder of the original key after dividing it by $2^N$—causes the keys to be distributed evenly among the buckets. But it also causes the keys in the range $2^k$ to $2^{k+1}-1$ to be spread evenly sub-dividing the range covered by the keys in the range 0 to $2^k-1$.

Therefore, when the number of buckets is doubled from $2^N$ to $2^{N+1}$, a key that hashed to bucket i in the smaller table hashes to either bucket i or bucket $(i+2^N)$ in the larger table. Thus, the first half (i.e., the half with the smaller numbers) of the new bucket array is just a copy of the old bucket array. Indeed, Shalev and Shavit exploit this property to avoid copying the old array; it becomes just the first half of their new array.

In the code presented by Shalev and Shavit in their paper, there is always sufficient space to avoid copying when increasing the number of buckets because they pre-allocate an array of MAX_TABLE_SIZE potential buckets and do not increase the number of buckets when it would exceed MAX_TABLE_SIZE. This approach restricts the applicability of their algorithm to applications in which a reasonable value for MAX_TABLE_SIZE can be determined ahead of time, and where pre-allocating that much storage for a table is acceptable. As we described, it is straightforward for one skilled in the art to extend their scheme to eliminate this restriction by using the "table doubling" technique. This technique requires that the table be copied when the number of entries in the table (i.e., the number of buckets) is increased (the cost of copying is amortized over the insertions and deletions as described above).

When we copy the old array into the new array, we need not copy the old array directly into the top half of the new array; we can use any injective mapping (i.e., one in which no two elements map to the same result) from entries in the old array to entries in the new array, copying the bucket pointer from the old array directly into its corresponding entry in the new array. Specifically, if we "interleave" the entries corresponding to buckets in the old array with entries that correspond to new buckets, we can eliminate the need for bit-reversal, as we describe in the next paragraph.

In this new approach, the linked list of nodes containing the elements in the hash table is ordered in increasing hash key order, rather than according to the recursive split-ordering of their hash keys (see FIG. 2B). FIG. 2B illustrates an exemplary bucket array 252, which includes buckets 254, 260, and 264. Buckets 254, 260, and 264 point to dummy nodes 255, 261, and 265, respectively. The linked list includes dummy nodes 255, 261, and 265, and data nodes 256-258, 262-263, and 266. Furthermore, in a bucket array of size $2^N$, the index of the bucket for an element is determined by the N "high-order" bits of its key. Thus, if a key has K bits, then bucket i contains those elements whose keys are in the range $i(2^{K-N})$ to $(i+1)(2^{K-N})-1$. When the number of buckets is increased to $2^{N+1}$, bucket i is split into buckets 2i and 2i+1, where bucket 2i corresponds to bucket i in the old bucket array, and bucket 2i+1 is the new bucket whose "parent" is the old bucket i (now bucket 2i). Upon encountering an uninitialized bucket at an even index 2i, an operation copies the value at index i in the old array. For uninitialized buckets at an odd index 2i+1, the operation initializes the bucket by looking at its "parent" bucket at index 2i in the new array (which corresponds to index i in the old array). No bit reversals are required in this scheme.

For an application in which pre-allocation of an appropriately sized array is possible and it is desirable to avoid copying, we can reduce the cost of bit-reversal by keeping the linked list in increasing hash key order and using the bit-reversed high order bits of the key as the index into the bucket array. This reduces the cost of bit-reversal because fewer bits need to be reversed.

Alternatively, we can use the same no-reversal method described for multiple bucket arrays but use just the originally-allocated array space. In this variation the table is filled sparsely when not many entries are being used, and the spaces "in between" are filled in as the load on the hash table increases. As an example, a table capable of holding 128 entries might be filled with "uninitialized" and then using only two bits to select buckets it would have only the four entries at 0, 32, 64, and 96 filled in with pointers to the start, first quarter, half, and third quarter points of the linked list of data. When the bucket array is "doubled in place", three bits of the hash code would be interpreted as bucket addresses so that the entries at 16, 48, etc. would also be used along with the ones already described.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage medium storing instructions that when executed by a computer cause the computer to perform a method for performing operations on a hash table that is fully dynamic and lock-free, the method comprising:
   performing a lookup in the hash table;
   wherein the hash table is stored in a computer system memory;
   wherein the hash table is implemented as a single linked list that includes a head node at the beginning of the single linked list, a set of data nodes, and a bucket array containing a set of bucket pointers
   wherein the set of bucket pointers point to respective portions of the single linked list that function as hash buckets, such that each bucket pointer except a first bucket pointer in the bucket array points at a data node immediately preceding the first data node in the corresponding portion of the single linked list, whereas the first bucket pointer points at the head node of the single linked list;
   wherein the single linked list contains only data nodes and the head node without using dummy nodes at the starts of the corresponding portions of the single linked list, wherein a dummy does not contain data; and
   wherein performing the lookup involves,
      using a hash key to lookup a bucket pointer in the bucket array,
      following the bucket pointer to a data node (or the head node) within the single linked list that precedes nodes in an associated hash bucket; searching through the single linked list from the data node to locate a node that matches the hash key;
      returning the located data node from the computer system memory if one exists; and
      reporting the data node is missing if one does not exist.

2. The computer-readable storage medium of claim 1, wherein if the data node pointed to by the bucket pointer is a deleted node, the method further comprises performing a recovery operation.

3. The computer-readable storage medium of claim 2, wherein if the next pointer of the deleted node has been set to point to backwards to a preceding data node, performing the recovery operation involves searching through the single linked list from the preceding data node to locate a node that matches the hash key, if one exists.

4. The computer-readable storage medium of claim 2, wherein if the next pointer of the deleted node points to a following node in the single linked list, and therefore has not been set to point to a preceding node, performing the recovery operation involves:
- obtaining a parent bucket pointer;
- searching through the single linked list from a node pointed to by the parent bucket pointer to locate a starting node for the bucket pointer;
- updating the bucket pointer to point to the starting node; and
- searching through the single linked list from the starting node to locate a node that matches the hash key, if one exists.

5. The computer-readable storage medium of claim 4, wherein if the data node pointed to by the parent bucket pointer is a deleted node, the method further comprises recursively using higher-level parent bucket pointers to locate a node that matches the hash key, if one exists.

6. The computer-readable storage medium of claim 1, wherein the method further comprises deleting a target node from the single linked list by:
- using a key to determine to a reference to the target node to be deleted from the single linked list;
- atomically marking a next pointer in the target node to indicate that the target node is deleted; and
- atomically modifying the next pointer of a node immediately preceding the target node in the single linked list to point to a node immediately following the target node in the single linked list, instead of pointing to the target node, thereby splicing the target node out of the single linked list.

7. The computer-readable storage medium of claim 6, wherein if a process that deleted the target node does not perform the splicing operation, another process, which subsequently detects that the target node has been deleted, performs the splicing operation.

8. The computer-readable storage medium of claim 6, wherein after the target node is spliced out of the single linked list, the method further comprises modifying the next pointer of the target node so that the next pointer remains marked but points to the node that immediately precedes the target node when the target node was spliced out instead of the node immediately following node the target node in the single linked list.

9. The computer-readable storage medium of claim 6, wherein atomically marking the next pointer in the target node to indicate that the target node is deleted involves atomically setting a "deleted bit" in the next pointer.

10. The computer-readable storage medium of claim 6, wherein atomically marking the next pointer in the target node to indicate that the target node is deleted involves:
- creating a special node with a deleted type, which points to the immediately following node in the single linked list; and
- atomically replacing the next pointer of the target node with a pointer to the special node.

11. The computer-readable storage medium of claim 6, wherein when atomically marking the next pointer of the target node, if the next pointer indicates that the target node is already deleted, the atomic modification operation fails and the method further comprises taking a remedial action to deal with the fact that the target node is already deleted.

12. The computer-readable storage medium of claim 1, wherein the method further comprises inserting an additional node into the single linked list by:
- identifying a node that should immediately precede the additional node in the single linked list;
- identifying a node that should immediately follow the additional node in the single linked list; and
- splicing the additional node into the single linked list by,
  - setting the next pointer for the additional node to point to the immediately following node, and then
  - atomically updating the next pointer of the immediately preceding node to point to the additional node.

* * * * *